July 16, 1929.  V. C. BERNHARDT  1,721,329
AIRPLANE WING CONSTRUCTION
Filed Oct. 18, 1928   2 Sheets-Sheet 1
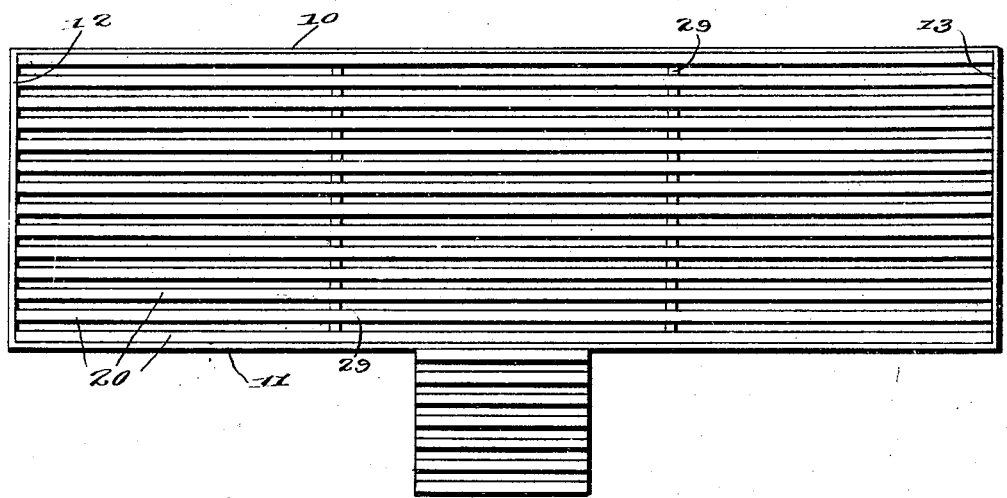
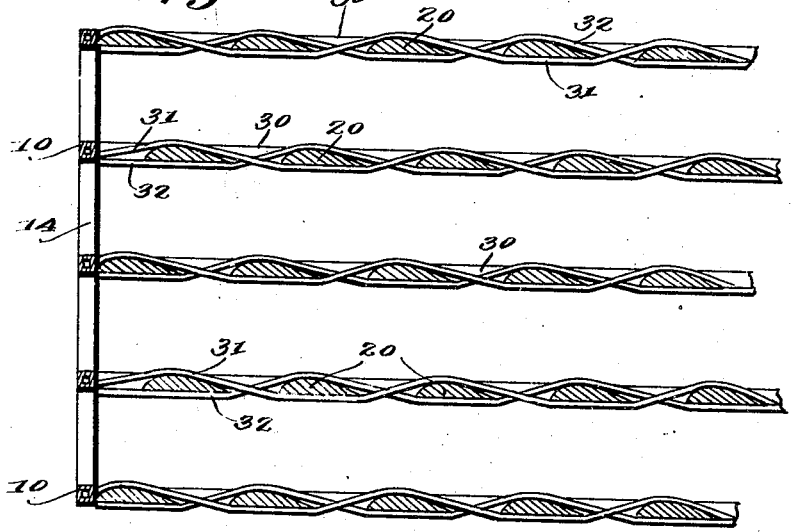
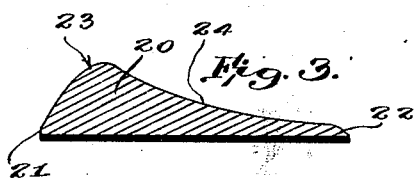
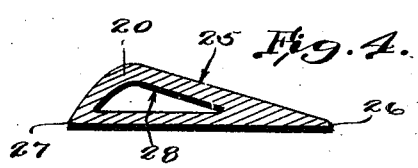
WITNESSES
C. B. Skillings
INVENTOR
Victor C. Bernhardt
BY
Munn & Co
ATTORNEY

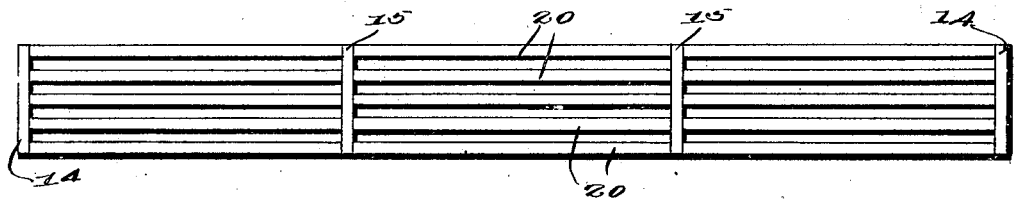
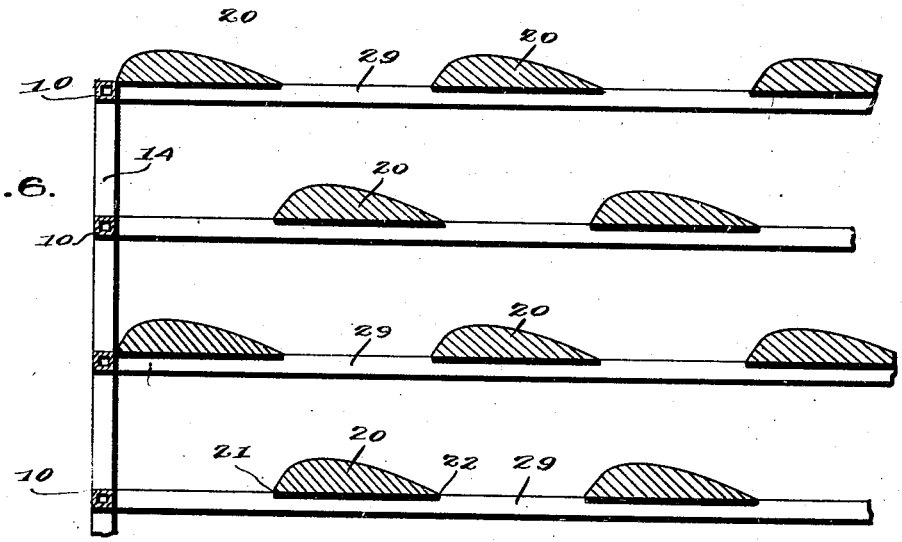
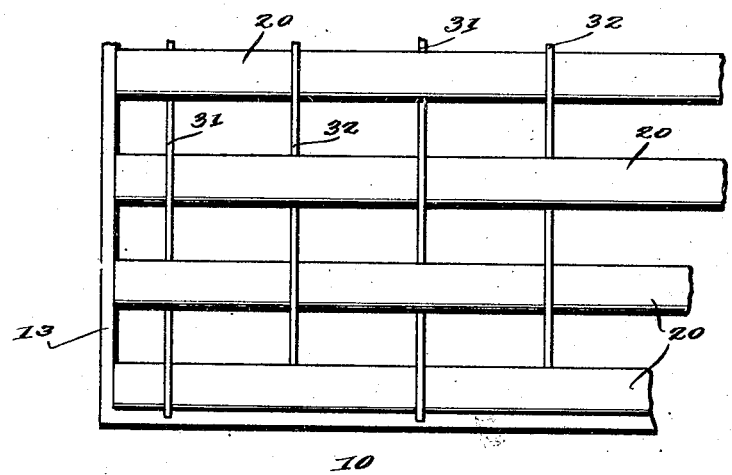

Patented July 16, 1929.

1,721,329

UNITED STATES PATENT OFFICE.

VICTOR C. BERNHARDT, OF DETROIT, MICHIGAN.

AIRPLANE-WING CONSTRUCTION.

Application filed October 18, 1928. Serial No. 313,325.

This invention relates to airplane construction.

An object of the invention is the provision of a wing construction for airplanes in which a plurality of surfaces are disposed in staggered relation in different horizontal planes for increasing the lifting surface.

A further object of the invention is the provision of a wing construction for airplanes in which a plurality of surfaces are spaced from each other in horizontal planes, said surfaces in one horizontal plane being staggered relative to surfaces in alternate planes, each surface being formed of light material having sufficient strength for the purpose and may be either solid or hollow.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of a wing construction disclosing the principles of my invention, Figure 2 is a transverse vertical section of a modified form of the wing construction, Figure 3 is a transverse section of one form of a lifting surface, Figure 4 is a transverse section on a modified form of one of a series of lifting surfaces embodied in the wing, Figure 5 is an end view of the wing construction shown in Figure 1, Figure 6 is a fragmentary transverse vertical section of the construction shown in Figure 1, and Figure 7 is a fragmentary plan view of the wing construction shown in Figure 2.

Referring more particularly to Figures 1, 5 and 6, it will be seen that a metal frame is formed having longitudinal members 10 and 11 and end members 12 and 13. These longitudinally disposed members and end members form part of the construction of the wing in which surfaces are disposed in spaced horizontal planes. Vertical disposed struts 14 and 15 are secured to the frame members 10 to 13, inclusive, for supporting the various surfaces of the wings in position. Struts similar to the struts 14 and 15 are located intermediate the longitudinal edges of the wing for reinforcing the wings at these points. The elements just described may be hollow or solid, depending upon the kind of material employed for the purpose.

Secured to the members 10 to 15, inclusive, in any manner, are a plurality of spaced horizontal surfaces 20. Each surface may be formed in the manner shown in Figure 3 in which a leading edge 21 and a trailing edge 22 are provided, with the portion 23 adjacent the leading edge being thickened so that the cross sectional area of each surface will simulate the cross sectional area of the usual wing construction employed on airplanes today. The portion of each surface between the thickened portion 23 and the trailing edge 22 is curved downwardly or inwardly, as shown at 24.

A modified form of the surface is shown in Figure 4 in which the portion 25 is flat instead of curved, as shown in Figure 3, and which is inclined rearwardly towards a trailing edge 26. The opposite edge of the surface presents a leading edge 27. The central portion of each surface 20$^a$ is hollow, as shown at 28, in order to provide for lightness which will be effective for buoying a plane on a surface of water. In other words, the chambers 28 form air pockets.

Referring more particularly to Figure 6 it will be seen that the surfaces 20 are supported intermediate their ends by transverse bars 29 which are secured at their forward ends to the members 10 and at their rear ends to the members 11. The bars 29 may be disposed in parallel relation or they may be disposed rearwardly to give the general appearance of the usual wing construction as manufactured today. The surfaces 20 are welded or secured to the various bars in any approved manner.

Referring more particularly to Figures 2 and 7 it will be seen that modified forms of the means of supporting the surfaces 20 are employed. To the members 14 or 15 are secured the horizontal bars 10 and the transverse bars 30. The lifting surfaces 20 have their ends abutting the bars 30 at the opposite ends of the wing and are secured in any approved manner to said bars. Reinforcing wires 31 and 32 have their ends secured to the framework at the front and rear of the wing and are threaded through the surfaces 20 so that the wires alternately cross each other upon opposite sides of the surfaces. The wires may be closely associated with each other and secured together at points where they cross or they may be spaced apart, as shown in Figure 7. Furthermore, the wires may be secured to the opposite faces of the lifting surfaces 20. It will be noted from an inspection of Figure 2 that the lifting surfaces in one row or in one horizontal plane are staggered relative to the lifting surfaces in the adjacent horizontal rows.

I claim:

1. An airplane wing construction comprising a frame, a plurality of lifting surfaces spaced from each other in different horizontal planes, the lifting surfaces in one plane being staggered relative to the lifting surfaces in adjacent planes, and reinforcing wires interwoven about the planes for aiding in retaining the planes in position.

2. An airplane wing construction comprising a frame, a plurality of lifting surfaces spaced from each other in different horizontal planes, each lifting surface being hollow and airtight, and reinforcing wires interwoven about the planes.

3. An airplane wing construction comprising a frame, a plurality of lifting surfaces spaced from each other in different horizontal planes, wires interwoven between the surfaces aiding in supporting the surfaces intermediate their ends.

4. An airplane wing construction comprising a frame, a plurality of lifting surfaces spaced from each other in different horizontal planes, and reinforcing wires interwoven around the lifting surfaces and having their ends secured to the frame.

VICTOR C. BERNHARDT.